UNITED STATES PATENT OFFICE

RAYMOND RONALD RIDGWAY, OF NIAGARA FALLS, NEW YORK, ASSIGNOR TO NORTON COMPANY, OF WORCESTER, MASSACHUSETTS, A CORPORATION OF MASSACHUSETTS

BORON CARBIDE AND METHOD OF MAKING THE SAME

No Drawing.   Application filed May 14, 1930. Serial No. 452,512.

This invention relates to boron carbide and a method of making the same.

It has long been known that the elements boron and carbon unite to form a compound which Henri Moissan in his book on the electric furnace states is a carbon boride having the formula $B_6C$. There are also vague references in the literature to another compound having a still higher percentage of boron in its composition. The attempts at producing boron carbide on a commercial scale have heretofore resulted in a product which is highly contaminated with impurities, and while this material in its crude form has shown great hardness by the scratch test yet it has not proven satisfactory for use as an abrasive because it is friable and mechanically weak in its structure and contains ingredients which are affected by water. These defects are believed to be due in part to the presence of a considerable amount of graphite as well as other impurities which render a grinding wheel made therefrom too soft in its cutting action for ordinary practical use. Moreover, the industrial development of this boron compound has been delayed by the fact that only very low yields could be obtained by the methods of manufacture previously suggested.

The primary objects of this invention are to provide a boron carbide of such a chemical composition and of such physical structure that it will serve the highly useful purposes of abrading or grinding various materials, and in particular to provide a boron carbide which will be superior in quality to that heretofore produced and which will be sufficiently free from contaminating ingredients and have a crystal structure of such size and condition that the material will be highly useful in many ways.

A further object is to provide a simple, economical and feasible method of making such a material on a commercial scale.

I have found that the weakness of structure observed in boron carbide as previously made is due in part to the presence of iron, aluminum, silicon and other impurities which are capable of existing as carbides and borides intermingled with the crystals of boron carbide. It is found also that graphite has been present as parting planes between the crystals of boron carbide and so served to weaken the crystal structure materially. On the other hand, it is highly desirable that the boron carbide crystals be large in size so that the abrasive grains as used may each be made of a single crystal or a fragment of a crystal, and which is not easily broken or crushed under the pressure and forces met in a grinding or abrading operation. In accordance with my invention I find it feasible to eliminate these undesirable impurities and to provide a boron carbide which has a crystal structure of great hardness and mechanical strength, and in particular to provide an abrasive material in which from 75 to 90% and oftentimes more of the material consists of crystalline boron carbide of high mechanical strength and a glassy continuous crystalline structure.

In the course of my experimentation, I have made boron carbide having a chemical composition which by analysis closely approximates the formula $B_4C$. This boron carbide is extremely hard and durable and is of high chemical stability and has such a crystalline structure that it may be utilized as an abrasive material.

Boron carbide of the formula $B_4C$ may be made in accordance with my invention by heating boron oxide with carbon in an electric resistance furnace at a temperature between 2000° and 2600° C., preferably around 2400° C., and that the desired results are obtained if the molecular proportions of boron oxide and the carbon are used in accordance with the formula:

$$2B_2O_3 + 7C = B_4C + 6CO$$

If boron is employed in greater quantity than required by this formula, a subsequent treatment of the resultant material with acid shows that there is free boron present, while if too little boron is used an excess of graphite is found as parting planes between the various crystals of boron carbide.

As an example of one process suitable for producing this new material, substantially pure boric acid may be heated in an electric furnace to remove the water of crystallization and to form the anhydrous boron oxide $B_2O_3$. This boron oxide is then mixed with carbon, which is preferably in the form of petroleum coke of high purity, the materials being proportioned in accordance with the above formula. The mixture is charged into an electric furnace of the so-called resistance type and suitably packed around the resistance conductor of carbon. Sawdust may be added to the mixture to give it the desired porosity to allow the large volume of reducing gases to escape. It is also found advantageous to mix the material with kerosene oil in order to aid in packing it properly into the furnace. When this mixture is heated by the electric current, the volatile oil vaporizes and displaces the oxygen and nitrogen which may be present in the charge and drives them from the reaction zone. The formation of any nitrogen or oxygen compounds with boron is thereby avoided by controlling the reaction zone atmosphere.

The presence of water in the mixture is to be avoided because of the danger of rehydrating the anhydrous boron oxide. If the hydrated boron oxide is employed, this material melts in its water of crystallization at about 350° C. and the oxide escapes from the furnace as a dense white cloud of fumes. The furnacing operation is otherwise carried on in accordance with standard practice, and methods well known to those skilled in the art are employed so as to obtain the maximum yield of crystals. As above stated the temperature is regulated to be about 2400° C., and this is accomplished by controlling the power input.

Boron metal has a high vapor pressure near its melting point, hence at this high electric furnace temperature there is a tendency for the metal to distill away and leave a carbon rich mixture. For that reason I employ a resistance type of furnace which has different temperature zones so that as the reduced and volatilized boron metal is driven outwardly from the center it impregnates and boronizes the mixture surrounding the power input resistor. The boron is condensed from the vapor phase in the presence of carbon and combines with this carbon either in the solid or in the vapor phase to form a crystalline product which is believed to have the formula $B_4C$. The resultant boron carbide is very stable and is not decomposed by the furnace heat. It does not vaporize in the manner in which the boron metal does, but it melts to a liquid phase and crystallizes therefrom. Hence it will not break down and the boron distill away from the compound as does silicon from silicon carbide.

In the furnacing operation, it is found that as the heat increases and the high temperature zone moves outwardly from the resistance element there is a tendency for the formation of a cavity at the center of the furnace, and outside of this cavity is a zone in which the boron carbide is found. As the heat moves outwardly, this boron carbide apparently melts and recrystallizes in the zones farther away from the center, but ultimately forming a mass of substantially pure boron carbide surrounding the furnace center. In the cooler zone outside of this ring of pure boron carbide is found loosely knit boron carbide crystals mixed with boron oxide and carbon, and of course outside of this is the unconverted mixture. All of the boron metal vapor has been condensed within the furnace and has not escaped to any material extent. Carbon is readily dissolved in boron carbide at the temperature of this reaction, but because of the cavity which forms between the ring of pure boron carbide and the carbon resistor there is no intimate contact between the two. Hence, the contamination of the boron carbide with graphite from this source of contamination is minimized. In accordance with this method, I do not employ a graphite container and melt the boron carbide in contact therewith; but I maintain around the pure product being formed a zone of the unconverted boron oxide and carbon, which may become rich with boron condensate, and thereby provide a container for the crystals which does not carry an excess of carbon. By taking care in separating the central zone of boron carbide crystals from the outer boron rich mixture, I may obtain only the pure product. The purity of the final product therefore depends on its location in the furnace, and how much of the outer layer of material is removed. Ordinarily, a commercial yield will provide a material containing at least 90% of the boron carbide, but for many uses a purity as low as 75% or even lower is satisfactory.

An analysis of the product made in accordance with this process gives the following composition which closely approximates the formula $B_4C$:

| | Per cent by weight |
|---|---|
| Boron | 78.22 |
| Silicon | 0.01 |
| Iron | 0.14 |
| Total carbon | 20.97 |
| Total composition | 99.34 |

This new material as thus made is characterized by a glassy conchoidal fracture showing continuous crystals of a size large enough for all abrasive and cutting purposes. These appear as a continuous single phase and without inter-granular weakness. The crystalline structure is believed to be hexagonal in character but this has not been definitely established. However, the crystals are mechanically strong as compared with the materials heretofore manufactured and considered to be boron carbide, and the crystals may be crushed to a suitable grain size so that each grain may be made up of a single crystal or the fragment of a larger crystal and therefore have highly desirable abrasive qualities. The material as described is free from boron, silicon, iron, aluminum and separated graphite to any detrimental extent, hence the material has the maximum strength and durability for abrasive purposes. Boron carbide of the formula $B_4C$ melts at a temperature of about $2400 \pm 50°$ C., and probably about $2375°$ C., as measured by optical methods.

The boron carbide in this form will very readily scratch silicon carbide and may be utilized for polishing diamonds, the hardest known material, as well as for cutting other hard substances which are found in industrial uses. Being much harder than tungsten carbide, silicon carbide and crystalline alumina, it may be readily used for sharpening or truing tools made of such materials and it is particularly useful as a lapping powder in many abrading operations. It may be bonded with bonds of various known types into integral grinding wheels or other articles of abrasive nature.

Having thus described my invention, what I claim as new and desire to secure by Letters Patent is:

1. A composition of matter comprising boron carbide having a composition which corresponds substantially with the formula $B_4C$.

2. A composition of matter containing at least 75% of boron carbide in crystalline form which has a composition conforming substantially to the formula $B_4C$.

3. A composition of matter, comprising boron carbide characterized by a continuous crystalline structure of extreme hardness, high chemical stability and great mechanical strength, and which has a composition conforming substantially with the formula $B_4C$.

4. A composition of matter comprising boron carbide in crystalline form which is substantially free from the carbides of aluminum, iron and silicon and has a composition conforming substantially with the formula $B_4C$.

5. A composition of matter comprising boron carbide having a composition conforming substantially with the formula $B_4C$ and a continuous crystalline structure substantially devoid of parting planes of graphite and characterized by its extreme hardness and high mechanical strength.

6. A composition of matter containing at least 90% of crystalline boron carbide which is substantially free from compounds of iron, silicon and aluminum and which has a composition conforming substantially with the formula $B_4C$.

7. A composition of matter containing at least 90% of boron carbide having a continuous crystalline structure and a composition conforming substantially with the formula $B_4C$, which is substantially devoid of free graphite, iron, silicon and aluminum, and is characterized by extreme hardness, high chemical stability and great mechanical strength.

8. The method of making boron carbide comprising the steps of providing a mixture of substantially two molecular equivalents of completely dehydrated boron oxide and seven molecular equivalents of carbon, charging it into an electric resistance furnace around a resistor, heating the latter by an electric current to produce an inner reducing zone having a temperature above the vaporizing point of boron and progressively raising the temperature of the surrounding mixture so that it becomes rich with boron condensate derived from the inner zone and boron carbide is formed in a progressively enlarging tubular ingot which is characterized by a continuous crystalline structure substantially devoid of free graphite.

9. The method of making boron carbide comprising the steps of purifying boric acid to eliminate iron, aluminum, silicon and other detrimental compounds therefrom, heating the acid to dehydrate the same completely and form anhydrous boron oxide, mixing two molecular equivalents of the latter with seven molecular equivalents of carbon of high purity, electrically heating the central zone of the mixture to a temperature of approximately $2400°$ C. and maintaining the current flow until a ring zone of material surrounding said central zone has been converted to crystalline boron carbide and thereafter separating the outer zone of unconverted material from the crystalline product.

10. The method of making boron carbide comprising the steps of mixing two molecular equivalents of anhydrous boron oxide and seven molecular equivalents of carbon with kerosene, charging a resistance furnace therewith and heating the mixture electrically to provide an inner zone temperature of about $2400°$ C. and produce boron carbide of a composition corresponding with the formula $B_4C$ while maintaining an atmosphere consisting essentially of carbon monoxide substantially free from water vapor.

11. Method of making boron carbide comprising the steps of charging a resistance furnace with a mixture of about two molecular equivalents of anhydrous boron oxide which is substantially free from iron, aluminum and silicon, and seven molecular equivalents of carbon, passing an electric current through the furnace and heating an inner zone of the mixture in an atmosphere of carbon monoxide to a temperature above the melting point of boron carbide and progressively raising the temperature of the surrounding material and thereby enlarging the said inner zone so as to form an ingot of boron carbide, thereby producing boron carbide characterized by a continuous crystal structure substantially devoid of free graphite and having substantially the formula $B_4C$.

12. The method of making boron carbide comprising the steps of making a mixture of substantially two molecular equivalents of anhydrous boron oxide and seven molecular equivalents of carbon and heating the mixture in an atmosphere consisting essentially of carbon monoxide to a temperature of approximately 2400° C. thereby producing an ingot of boron carbide characterized by a continuous crystalline structure and having substantially the formula $B_4C$.

Signed at Niagara Falls, N. Y., this 8th day of May, 1930.

RAYMOND RONALD RIDGWAY.